United States Patent
Nickel

[11] 3,741,648
[45] June 26, 1973

[54] ACOUSTIC BEAM SPLITTER FOR INFRARED LASERS

[75] Inventor: George H. Nickel, Los Alamos, N. Mex.

[73] Assignee: The United States of America as represented by the Secretary of the Air Force, Washington, D.C.

[22] Filed: July 16, 1971

[21] Appl. No.: 163,223

[52] U.S. Cl.................. 356/51, 350/161, 250/199, 331/94.5
[51] Int. Cl. .......................... H01s 3/12, G02f 1/32
[58] Field of Search.................. 331/94.5; 250/199; 350/161; 330/4.3; 356/51

[56] References Cited
UNITED STATES PATENTS 3,324,478  6/1967  Jacobs .............................. 346/108
3,566,303  2/1971  De Maria ....................... 350/161 X

OTHER PUBLICATIONS

Dixon et al., Applied Physics Letters, Vol. 9, No. 5, 1, Sept. 1966, pp. 190–192 QC1A745

Primary Examiner—Ronald L. Wibert
Assistant Examiner—R. J. Webster
Attorney—Harry A. Herbert, Jr. et al.

[57] ABSTRACT

Ultrasonic waves are used to create a pseudograting that diffracts a small fraction of power from a high power infrared laser beam. The deflected portion of beam is analyzed using a scanning type infrared detector. The laser beam acoustic wave interaction occurs in a gaseous medium.

1 Claim, 1 Drawing Figure

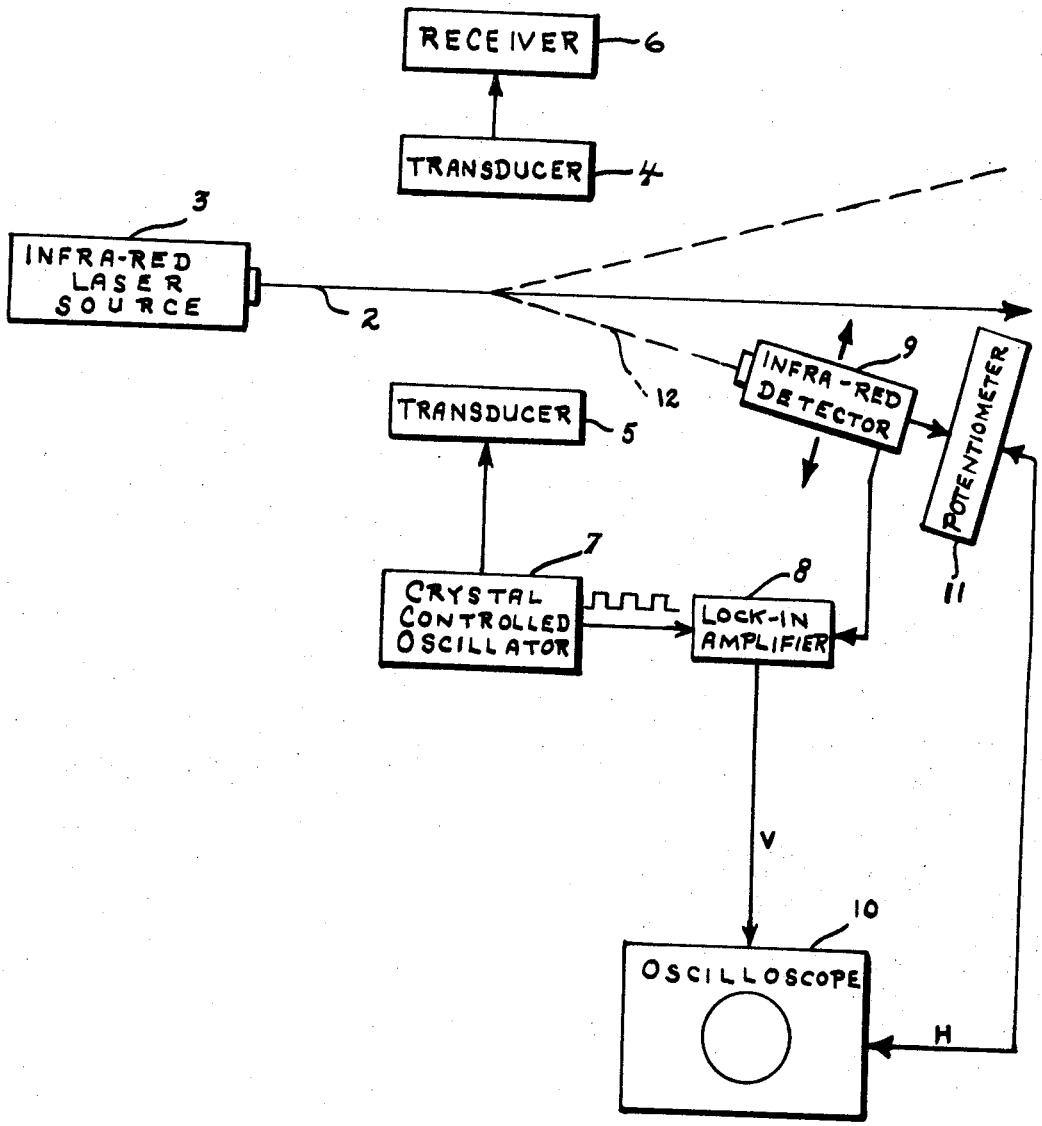

ACOUSTIC BEAM SPLITTER FOR INFRARED LASERS

BACKGROUND OF THE INVENTION

This invention relates to high power infrared lasers and in particular to means for detecting, analyzing and monitoring high power laser beams without perturbing them.

It is often necessary to align, adjust, and evaluate new high power infrared lasers and also to provide for the continuous monitoring of operational lasers. However, using currently available techniques it is not possible to probe the cross section of a very high power beam without introducing some solid mirror, screen, or detector into the high power region. These materials eventually distort, fracture, or even vaporize as beam power is increased. Also the beam itself is usually distorted or even terminated by the solid material. There currently exists therefore the need for new techniques and apparatus that analyze high power laser beams without the insertion of perturbing influences into the beam. The present invention is directed toward accomplishing this and other ends.

SUMMARY OF THE INVENTION

A very small fraction of the power in an intense infrared laser beam is deflected from the main beam through a small angle. This deflected beam is scanned with conventional infrared detectors to monitor temporal and spatial dependence of the beam power. The undeflected beam is unperturbed. Deflection is accomplished by an ultrasonic wave propagating at right angles to the laser beam. Alternate regions of higher and lower gas density in the sound wave create a very weak sinusoidal phase grating in the gas. The first order diffracted beam is the desired output.

It is a principal object of the invention to provide a new and improved beam-splitter for high power infrared lasers.

It is another object of the invention to provide means for analyzing a high power infrared laser beam that does not require the use of beam perturbing devices.

It is another object of the invention to provide an ultrasonic wave device that is adapted to diffract portions of power from an intense infrared laser beam in a gaseous medium.

These, together with other objects, features and advantages of the invention will become more apparent from the following detailed description taken in conjunction with the accompanying drawing.

DESCRIPTION OF THE DRAWING

The sole FIGURE of the accompanying drawing is a block diagram illustrating the presently preferred embodiment of the invention.

DETAILED DESCRIPTION OF THE PREFERRED EMBODIMENT

Referring now to the sole figure of the drawing, laser beam 2 generated by infrared laser source 3 is monitored and analyzed by the apparatus of the invention. The invention comprehends high power devices such as, for example, a source that produces a 16 watt or higher $CO_2$ laser beam. Ultrasonic transducers 4 and 5 are positioned such that their acoustic wave propagating surfaces are in close parallel relationship to laser beam 2. The transducerscan be identical piezoelectric substrate members having plated metallic electrodes. Receiver transducer 4 is mounted in a fixed position. Transmitter transducer 5 is mounted in a variable two axis plus translation mount. Micrometer screws (not shown) are provided to permit adjustement of the transducer faces for parallelism. The translation capability provides for: course adjustment of the transducer separation to allow passage of the laser beam; fine adjustment of the transducer separation to maximize the standing waves as indicated by receiver 6; and the measurement of the acoustic wavelength. The electrical drive to the transducer is provided by crystal controlled oscillator 7. For use in conjunction with lock-in amplifier 8 oscillator 7 is keyed with a square wave system clock signal. Such a signal may conveniently have a frequency that is variable from a few hundred Hz to several KHz. The interaction region (between transducers 4 and 5) of the laser beam and the acoustic waves is a gaseous medium (such as air) and must be shielded from wind currents to prevent modulation of acoustic intensity.

It is a novel feature of the invention to scan a laser beam using an ultrasonic diffraction grating in gaseous medium. It is very difficult to transfer acoustic power from a solid transducer to a gas. Furthermore, because the density of gas is very low, the change in the index of refraction in an acoustical grating is very small for a gas when compared with liquids or solids. Thus the diffraction effect is very slight. With extremely high power density in the laser beam, however, the small fraction of deflected power is acceptable. Also, with weak diffraction, multiple diffraction effects due to grating thickness will be minimized.

The deflected fraction of laser power 12 is scanned by infrared detector 9. Such a detector may be a mercury-cadmium telluride detector of the type manufactured by Honeywell Corporation, Model DLK13C10. The output of detector 9 and the square wave system clock signal are connected to lock-in amplifier 8. The output of amplifier 8 then drives the vertical input of oscilloscope 10. The horizontal input of oscilloscope 10 is driven by a fluctating voltage that is responsive to the scan of detector 9. The lateral motion of detector 9 causes rotation of precision potentiometer 11 which in turn generates the required varying voltage.

While the invention has been described in one presently preferred embodiment, it is understood that the words which have been used are words of description rather than words of limitation and that changes within the purveyance of the appended claims may be made without departing from the scope and spirit of the invention in its broader aspects.

What is claimed is:

1. High power infrared laser beam analyzing apparatus comprising;
    means for deflecting a portion of said laser beam in an air medium, said means including an electromagnetic wave to acoustic wave transducer having its acoustic wave propagating surface in proximate relationship with said laser beam and oriented to transmit transverse waves thereacross for forming an ultrasonic diffraction grating means in the air medium in which said laser beam is located,
    an oscillator circuit having a power capacity sufficient to electrically drive said transducer connected thereto, said oscillator circuit further comprising means for generating a system clock signal, an infrared scanning detector positioned to scan said deflected laser beam,
means for generating a voltage responsive to the scan rate of said detector,
a lock-in amplifier,
means connecting the output of said detector to said lock-in amplifier,
means connecting the system clock signal output to said lock-in amplifier,
an oscilloscope,
means connecting the output of said lock-in amplifier to the vertical input of said oscilloscope, and
means connecting the scan rate responsive voltage to the horizontal input of said oscilloscope.

* * * * *